United States Patent [19]

Odaira

[11] Patent Number: 5,000,976

[45] Date of Patent: Mar. 19, 1991

[54] METHOD OF CONVERTING THE COMPOSITION OF PEAT

[76] Inventor: Keikichi Odaira, 25-102, 18 4-chome, Ohi, Shinagawa-ku, Tokyo, Japan

[21] Appl. No.: 768,183

[22] Filed: Aug. 23, 1985

Related U.S. Application Data

[63] Continuation of Ser. No. 256,976, Apr. 23, 1981, abandoned, which is a continuation-in-part of Ser. No. 169,461, Jul. 16, 1980, abandoned.

[30] Foreign Application Priority Data

Mar. 21, 1980 [JP] Japan .................................. 55-36527
Mar. 28, 1980 [JP] Japan .................................. 55-40843

[51] Int. Cl.$^5$ ........................... A23K 1/00; A01G 1/04
[52] U.S. Cl. .................................... 426/635; 426/416; 426/807; 47/1.1; 71/5
[58] Field of Search ................................ 426/416, 635

[56] References Cited

U.S. PATENT DOCUMENTS 3,828,470 8/1974 Stoller .................................. 71/5 X
4,127,965 12/1978 Mee ....................................... 71/5 X

*Primary Examiner*—Ferris H. Lander
*Attorney, Agent, or Firm*—Oblon, Spivak, McClelland, Maier & Neustadt

[57] ABSTRACT

A method of converting the composition of peat which comprises the steps of:
  mixing the peat with 10 to 40% by weight of particles of cereals such as corn or bran thereof on the basis of the weight of the peat;
  culturing the hyphas of a mycorhiza-forming, white-rotting edible mushroom with the mixture used as a culture bed;
  germinating the resultant fruit bodies;
  removing the fruit bodies from the culture bed;
  utilizing the residue as a livestock feed; and
  where required, adding a fermentation agent to the residue to ferment it into a fertilizer.

5 Claims, No Drawings

METHOD OF CONVERTING THE COMPOSITION OF PEAT

Cross-Reference to Related Application

This application is a continuation of application Ser. No. 256,976, filed Apr. 23, 1981, now abandoned, which is a continuation-in-part application of the U.S. Pat. application Ser. No. 169,461 filed July 16, 1980, now abandoned.

BACKGROUND OF THE INVENTION

This invention relates to a method of converting the composition of peat (grass peat) for use as livestock feed or fertilizer.

Peat strata are widely found in the marshy regions of frigid zones spread between 40° and 60° of the North Latitude. The peat has various kinds such as grass peat, forest peat and earthy peat. The peat generally contains large amounts of water and has a low quality as viewed from the object of practical application. At present, therefore, the peat is little used as fuel and only applied in improving the air-permeability of soil, and is mostly neglected as a material of low economic value.

SUMMARY OF THE INVENTION

This invention has been accomplished in view of the above-mentioned circumstances and is intended to provide method of converting the composition of peat for use as livestock feed or fertilizer, taking advantage of particular edible mushrooms which decompose lignin, chitin etc. in the peat.

Another object of the invention is to provide a method of converting the composition of peat to widen the scope of its application and also utilizing peat as a medium for manufacture of foodstuffs.

In other words, this invention is intended to provide a method of converting the composition of peat which characteristically comprises the steps of mixing about 10 to 40% by weight of cereals or brans thereof with peat on the basis of the total weight of peat and cereal or bran, culturing the hyphae of mycorhiza-forming, white-rotting edible mushrooms (or Hymenomycetes) with said mixture used as a culture bed, germinating fruit bodies and thereafter removing the fruit bodies from the culture bed.

Another object of the invention is to provide a method of converting the composition of peat which comprises the steps of mixing about 10 to 40% by weight of cereals or brans thereof with peat on the basis of the total weight of peat and cereal or bran, culturing the hyphae of mycorhiza-forming, white-rotting edible mushrooms (or Hymenomycetes) with the mixture applied as a culture bed, germinating fruit bodies, and adding a fermentation agent to the residue of the culture bed left after the removal of the fruit bodies for the fermentation of the residue.

Further object of the invention is to offer a product resulting from the conversion of the composition of peat by the above-mentioned process as a livestock feed or fertilizer.

DETAILED DESCRIPTION OF THE PREFERRED EMBODIMENTS

The present inventor has studied a method of widening the application of peat which has hitherto been put to little practical use and noticed that the main components of peat, such as the characteristic fibrous matter, chitin and lignin are very easily decomposed by mycorhiza-forming, white-rotting Hymenomycetes hyphae into readily fermentable matter. This invention has been accomplished by the discovery that the above-mentioned fact can be utilized in producing excellent livestock feed or fertilizer and also edible mushrooms of great economic value.

The method of this invention can use almost all known kinds of peat such as fen peat, moss peat, and forest peat. Cereals miscible with peat are not subject to any particular limitation. In other words, it is possible to utilize rice powder, rice bran, corn powder, corn bran, wheat powder, wheat bran and other kinds of cereals. These cereals can be applied just as obtained or in the form of dregs. These cereals should advisably be mixed with peat at the rate of 10 to 40% by weight or preferably 20 to 30% by weight based on the total weight of cereal and peat.

Edible mushrooms whose hyphae are to be useful in this invention are limited to mycorhiza-forming, white-rotting edible Hymenomycetes, such as Cortinellus Roza Lentinus (for example, *Lentinus edoes*), Tricholoma (for example, *Lyophyllum aggregatum*), and Pleurotus (for example, *Pleurotus ostreatus*). Lignin and chitin included in peat are generally known to be hardly decomposable. However, mycorhiza-forming, white-rotting edible Hymenomycetes such as mentioned above generate Ligninase and Chitinase as a result of their metabolism, and as a result peat which is not per se useful as a livestock feed or a fertilizer is conveniently converted to a high quality livestock feed a high quality fertilizer.

The residue of the culture bed left after the culture of the mushrooms may be crumbled and used as livestock feed just as so crumbled. However, the residue may be further fermented for use as fertilizer. In this case, it is preferred to add a fermentation agent for acceleration of the fermentation process. The fermentation agents used in the method of this invention include animal excrements such as those of chickens and earthworms, decompostion enzymes and other materials containing said decomposition enzymes. The animal excrement well serves the purpose, if it is added to the residue of the culture bed in a larger amount than 0.01% by weight based on the weight of the residue.

The cultivation of the hyphae and fruit bodies of edible mushrooms and the fermentation of the residue of the cultivation bed should preferably be carried out at temperatures well adapted for such purposes.

The main raw material used in the method of this invention is peat distributed over the earth surface in tremendous amounts and hitherto neglected as substantially valueless material though easily exploitable. Further, the method of this invention effectively utilizes the aforesaid natural cultivation and decomposition, enabling livestock feed and organic fertilizer to be produced in large quantities at low cost under a stable condition, and consequently making great contributions to the promotion of agricultural and social economy.

This invention will be more fully understood with reference to the examples which follow.

EXAMPLE 1

This example relates to the manufacture of livestock feed from peat. 1.5 kg of calcium, carbonate was thoroughly mixed with 100 kg of peat (found, for example, in the Nemuro district of Hokkaido, containing 70% of water and having pH of 4.0) to effect neutralization. Thereafter, the neutralized mass was mixed with 7.5 kg of rice bran (containing 13% of water) and 7.5 kg of corn powder (also containing 13% of water), providing a mixture containing about 60% of water. The mixture was sterilized for 30 minutes at a high temperature of 120° C. in an autoclave, and thereafter cooled with water to room temperature. 100 g of the hypra of Pleurotus ostreatus (hiratake) was subjected to inoculation culture with the mixture used as a culture bed (referred to as "a mixed culture bed"). The culture was brought to an end in 15 to 20 days. Where a culture bed mixed with, for example, rice bran or wheat bran was used with respect to the culture of the hypha of the *Pleurotus ostreatus* (hiratake), then, the culture period was shortened by about 10 days as compared with the conventional culture period. The culture bed in which culture was brought to an end was allowed to stand in an atmosphere kept at a temperature of 10° to 15° C. and a relative humidity of 80 to 90%, after taken out of a test vessel or instead with the test vessel left open. In 10 to 15 days, 30 to 35 kg of the fruit bodies of said *Pleurotus ostreatus* (hiratake) was produced. The residue of the culture bed left after the collection of the *Pleurotus ostreatus* (hirataka) was crumbled. The residue may be applied as livestock feed just as crumbled or after properly dried.

The composition of a livestock feed (PF) embodying this invention was analyzed. The results of the analysis were compared with those of the raw material peat (P), aforesaid mixed culture bed (M), known orchard (or pasture) grass (O) used as cattle-raising feed, and rice straw (R), the results of said comparison being set forth in Table 1 below. Column (C) of Table 1 indicates changes in the amounts of the respective components of the above-mentioned samples. The numerals given in Table 1 are equivalents when the samples were dried.

TABLE 1

|  | (P) % | (M) % | (C) % | (PF) % | (O) % | (R) % |
|---|---|---|---|---|---|---|
| Crude protein | 11.30 | 12.47 | +1.7 | 14.2 | 11.4 | 5.8 |
| Crude fat | 0.68 | 6.81 | −4.8 | 2.0 | 3.0 | 2.6 |
| Soluble nitrogen-free substance | 28.29 | 27.06 | +22.7 | 49.8 | 52.5 | 34.6 |
| Crude fiber | 29.25 | 29.22 | −12.8 | 16.4 | 23.8 | 38.5 |
| Crude ashes | 30.48 | 24.44 | −6.8 | 17.6 | 9.3 | 18.5 |
| Total | 100 | 100 |  | 100 | 100 | 100 |
| Lignin | 22.3 | 15.2 | −4.6 | 10.6 |  | 13.81 |

As seen from Table 1 above, the content of particularly crude fibrins matter and that of lignin are far more reduced in a livestock feed prepared by the method of this invention than in the peat used as a raw material. With the present livestock feed, the content of a soluble nitrogen-free substance is noticeably increased. Further, the content of crude protein and that of soluble nitrogen-free substance are well comparable with those of the orcharge grass known as an excellent livestock feed. The livestock feed of this invention contains very little undigestible matter such as crude fibrous matter and lignin. For the above-mentioned reason, the livestock feed of the invention obviously has a high nutritious effect. The value of a livestock feed is defined not only be its nutritious effect and digestibility but also by another important factor such as the taste of livestock. The livestock feed of the invention has been proved by the cattle-breeding experiments to be little inferior to any other good livestock feed.

EXAMPLE 2

*Pleurotus ostreatus* (hiratake) was produced by the same process as in Example 1. The residue of the culture bed left after the removal of the *Pleurotus ostreatus* (hiratake) was subjected to fermentation by the same process as in the preparation of compost. The residue was subjected to fermentation by such agents as particles of excrements of earthworms and chickens. Concretely, the particles of excrements of earthworms and chickens were mixed with the residue of the culture bed in an amount of 0.01 to 0.05% by weight based on that of the residue. Water was added to the mixture in an amount of about 60%. In this case, it is possible to use either the particles of chicken excrements or those of earthworm excrements alone. Or both fermentation agents may be jointly applied. These fermentation agents well serve the purpose if they are applied in a larger amount than 0.01% of the weight of the residue of a culture bed used. The residue of the culture bed to which a fermentation agent was added was allowed to stand 20 to 50 days at room temperature or a slightly higher temperature, thereby completing fermentation. The composition of the residue of the culture bed mixed with the fermentation agent was analyzed by the same process as in Example 1, the results being set forth in Table 2 below.

TABLE 2

|  | (PER) % | (W) % |
|---|---|---|
| Total carbon | 34.9 | 39.2 |
| Total nitrogen | 1.6 | 1.2 |
| Phosphoric acid | 1.4 | 1.1 |
| Pottasium | 0.5 | 0.8 |
| Magnesia | 1.3 | 5.5 |
| Lime | 12.4 | 13.2 |
| Total | 59.1 | 61.0 |
| Sulfuric acid type nitrogen | 3.2 mg % | 42.9 mg % |
| Ammoniac nitrogen | 34.2 mg % | 1.6 mg % |
| Lignin | 8.6 % | — |

Table 2 above shows numbers measured with reference to the analytical value of the composition of the particles of earthworm excrement known to have a very high fertilizer effect. In Table 2, the column (PER) shows the composition of a peat-base fertilizer manufactured by the process of Example 1, and the column (W) indicates the composition of a fertilizer formed of the particles of earthworm excrement. The peat-base fertilizer (PER) and the fertilizer of earthworm excrement (W) contained 32% of water before analysis.

As apparent from Table 2 above, the fertilizer of this invention has a fertilizer effect approximating that of the particles of earthworm excrement known by its high fertilizer effect. Moreover, almost all the nitrogen content of the present fertilizer is of the ammoniac type, proving the fertilizer to have a very excellent fertilizer effect.

To practically examine the effect of the above-mentioned fertilizer embodying this invention, salvia seedlings having the same extent of growth were respectively planted in a pat filled with 1 kg of river sand. Each pat was supplied with (1) 30 g of commercially available fermented organic fertilizer (mainly formed of oil cake and mixed with leaf mole), (2) 30 g of particles of earthworm excrement, (3) 30 g of a fertilizer embodying this invention which was prepared by the aforesaid process, and (4) 20 g of a chemical fertilizer.

Observation was made of the subsequent growth of the respective salvia seedlings. The following facts were recognized. Where a culture bed was formed of river sand originally destitute of a fertilizer effect, the fertilizer sample (4) did not display any fertilizer effect at all, causing the salvia seedling to wither. The fertilizer sample (1) neither indicated any substantial fertilizer effect. In contrast the fertilizer samples (2), (3) evidently showed a fertilizer effect. Moreover, the fertilizer sample (3) was proved to allow for the noticeable growth of the salvia seedling as a whole.

REFERENCE EXAMPLE

The process of above Example 1 was repeated except that 100 g of the hypha of *Agaricus campestris* (Haratake) was employed instead of *pleurotus ostreat*. In this case however substantially no fruit body of the *Agaricus campestris* was produced. The fact indicates that *Agaricus campestris* has substantially no function to decompose peat.

EXAMPLE 3

Mushrooms were cultured under a relative humidity of 65% by using Culture Bed "A" consisting of 200 parts by weight of peat, 100 parts by weight of rice bran, and 100 parts by weight of lime nitrogen and Culture Bed "B" consisting of 250 parts by weight of peat and 150 parts by weight of rice bran. Specifically, the culturing was performed as in Example 1 by inoculating several grams of hyphea of *Agaricus campestris* on Culture Bed "A" and the same amount of hyphae of *Pleurotus ostreatus* on Culture Bed "B".

46 g of Agaricus campestris was produced per 200g (dry basis) of Culture Bed "A" on the average. Likewise, 150 g *Pleurotus ostreatus* was produced per 200 g (dry basis) of Culture Bed "B" on the average.

Table 3 shows the culture bed compositions before and after the culturing. The numerals shown in Table 3 represent percent (%) by weight.

TABLE 3

|  | Culture Bed A | | Culture Bed B | |
| --- | --- | --- | --- | --- |
|  | Before Culturing | After Culturing | Before Culturing | After Culturing |
| Crude protein | 16.58 | 17.2 | 12.47 | 14.2 |

TABLE 3-continued

|  | Culture Bed A | | Culture Bed B | |
| --- | --- | --- | --- | --- |
|  | Before Culturing | After Culturing | Before Culturing | After Culturing |
| Crude fat | 6.12 | 4.4 | 6.81 | 2.0 |
| Soluble nitrogen-free substance | 26.00 | 28.1 | 27.06 | 49.8 |
| Crude fiber | 22.02 | 21.7 | 29.22 | 16.4 |
| Crude ashes | 29.28 | 28.6 | 24.44 | 17.6 |
| Lignin | 14.8 | 14.7 | 15.4 | 9.6 |

*Lentinus edodes* and *Tricholoma conglobatum* were also produced by using Culture Bed "B", with substantially the same result as in Table 3.

It is clearly seen from Table 3 that the peat is not decomposed sufficiently in the case of culturing *Agaricus campestr* is which does not belong to the mycorhiza-forming, white-rotting edible mushroom, resulting in failure to convert the peat into a satisfactory livestock feed or fertilizer.

I claim:
1. A method for manufacturing livestock feed from peat, which comprises the steps of:
    mixing the peat with about 10 to 40% by weight of cereals or brans on the basis of the total weight of the peat and the cereal or bran;
    culturing the hyphae of *Lentinus edodes* or *Pleurotus ostreatus* with the mixture used as a culture bed;
    germinating the resultant fruit bodies; and
    removing the fruit bodies from the culture bed.
2. The method according to claim 1 wherein the mixture of the peat and cereals is neutralized by a neutralization agent.
3. The method according to claim 1, wherein said cereal or bran is present is said peat in an amount ranging from 20 to 30% by weight based on the total weight of peat and said cereal or bran.
4. The method according to claim 1, wherein said cereal is rice powder, rice bran, corn powder, corn bran, wheat powder or wheat bran.
5. A livestock feed which is produced by the steps of:
    mixing peat with 10 to 40% by weight of cereals or brans on the basis of the total weight of said peat and the cereal or bran;
    culturing the hyphae of *Lentinus edodes* or *Pleurotus ostreatus* with said mixture used as a culture bed;
    germinating the resultant fruit bodies; and
    removing said fruit bodies from the culture bed, said fruit body free culture bed being available as said livestock feed.

* * * * *